United States Patent
Plonka et al.

(10) Patent No.: US 12,553,397 B2
(45) Date of Patent: Feb. 17, 2026

(54) METHOD AND DEVICE FOR GENERATING CORRECTING VARIABLES FOR COMPONENT PROTECTION DURING INTERNAL COMBUSTION ENGINE OPERATION

(71) Applicant: Robert Bosch GmbH, Stuttgart (DE)

(72) Inventors: Michaela Plonka, Vaihingen an der Enz (DE); Dominik Miekautsch, Korb (DE); Matthias Pfau, Meiningen (DE); Christian Diederich, Stuttgart (DE); Michael Stein, Loechgau (DE); Detlef Heinrich, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/809,474

(22) Filed: Aug. 20, 2024

(65) Prior Publication Data
US 2025/0067227 A1 Feb. 27, 2025

(30) Foreign Application Priority Data
Aug. 21, 2023 (DE) ...................... 10 2023 122 343.7

(51) Int. Cl.
*F02D 41/00* (2006.01)
*F02D 41/14* (2006.01)

(52) U.S. Cl.
CPC ..... *F02D 41/0007* (2013.01); *F02D 41/1447* (2013.01); *F02D 2041/1433* (2013.01)

(58) Field of Classification Search
CPC ......... F02D 2041/1433; F02D 41/1447; F02D 41/1486
See application file for complete search history.

(56) References Cited

FOREIGN PATENT DOCUMENTS

FR 2893979 A1 * 6/2007 ........... F02D 41/145

* cited by examiner

*Primary Examiner* — Ngoc T Nguyen
(74) *Attorney, Agent, or Firm* — Michael Best & Friedrich LLP

(57) ABSTRACT

A method for generating correcting variables for the operation of an internal combustion engine which comprises exhaust gas valves and which comprises at least one component, through which the exhaust gas of the internal combustion engine flows, wherein values of the temperature occurring at the exhaust gas valves during operation of the internal combustion engine are read out from a first characteristic map. The method is characterized in that values of correcting variables are read out from a further characteristic map, which is at least partially an inverted characteristic map with respect to the first characteristic map, which are predefined such that specified maximum values of the component temperature are not exceeded for the component through which the exhaust gas of the internal combustion engine flows. Respective independent claims are directed to a device configured for performing the method, a computer program configured for performing the method, and a machine-readable storage medium with a computer program stored thereon.

15 Claims, 1 Drawing Sheet

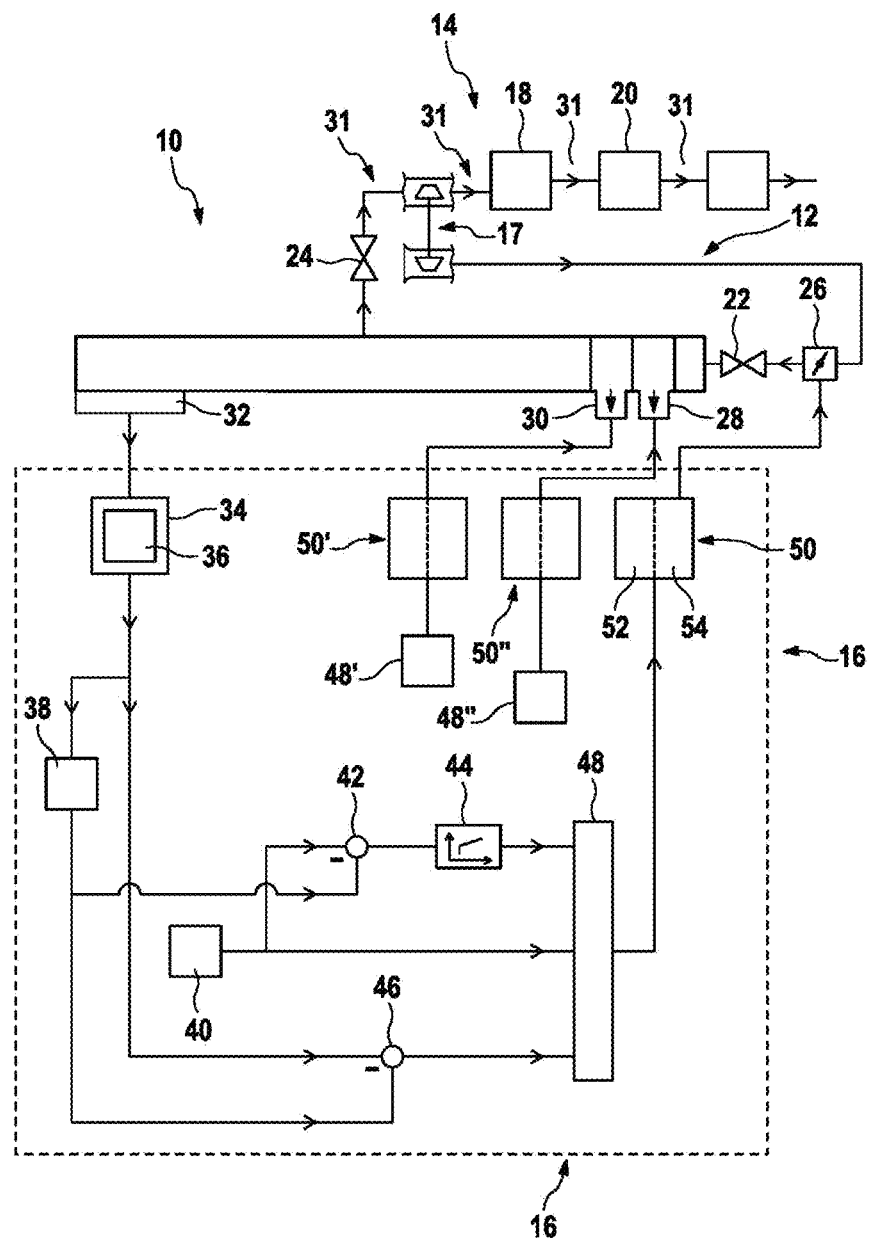

METHOD AND DEVICE FOR GENERATING CORRECTING VARIABLES FOR COMPONENT PROTECTION DURING INTERNAL COMBUSTION ENGINE OPERATION

BACKGROUND

The present invention relates to a method for generating correcting variables for the operation of an internal combustion engine comprising exhaust gas valves and comprising at least one component, through which the exhaust gas of the internal combustion engine flows. In this context, values of the temperature occurring at the exhaust gas valves during operation of the internal combustion engine are read from a first characteristic map, which is addressed by operating parameters of the internal combustion engine. The method is used to generate the correcting variables as a function of operating parameters of the internal combustion engine and temperatures read from the first characteristic map such that a maximum temperature specified for the component is not exceeded during operation of the internal combustion engine. Examples of components through which exhaust gas flows include catalytic converters or regions of catalytic converters, particulate filters, and exhaust gas manifolds or turbochargers. Such a method is inherently known.

Particularly in gasoline engines as internal combustion engines, temperatures can occur at the exhaust gas valves of the combustion chambers in the upper speed/charge region that are so high that they can lead to damage to the component in the exhaust gas system. For this reason, it is necessary to take appropriate measures to limit the temperatures occurring in the exhaust gas system in order to prevent component damage.

Measures to limit or reduce the temperature at the exhaust gas valves can include limiting the cylinder charging or enriching the combustion chamber mixture. In future systems, the temperature at the exhaust gas valve can also be lowered by injecting water into the intake tract or directly into the combustion chambers of the internal combustion engine. The maximum permissible temperature of the component is determined by means of parameters determined by test bench measurements.

During operation of the internal combustion engine, the distance to the current temperature at this point is determined by measurement or mathematical modeling for each maximum temperature applied to a point in the exhaust gas system. The minimum distance is determined from all the distances determined as the temperature difference for an exhaust gas system comprising multiple components. This minimum distance is compared with a distance threshold value and, if the distance falls below this threshold value, a measure is triggered to protect the component. The measure is, for example, an enriching or charging limitation specified by test bench measurements as a function of the speed/charge operating point of the internal combustion engine.

Measures that have a temperature-increasing effect and are therefore counterproductive are taken into account by means of additional enriching specified by test bench measurements. One example of such a measure is a deterioration in the efficiency of the combustion engine, which can result, for example, from late adjustments of the ignition angle resulting from driving dynamics controls, In addition, test bench measurements are used to make application-specific corrections to the enriching depending on the intake air temperature, the engine temperature and the vehicle speed. The enriching and/or the other corrections specified are preferably performed by accessing the corresponding pilot control characteristic maps.

In parallel or independently of the previously described open control chain, and thus pre-controlled component protection, a critical temperature threshold value can be determined for a defined component or part of a component in the exhaust gas system (e.g., exhaust gas manifold or catalytic converter) by means of test bench measurements and, depending on the temperature difference, the necessary enriching can be determined in a closed control loop by means of a controller. If the enriching reaches its maximum possible limit, e.g. for flammability reasons, the cylinder charge can also be reduced.

A real-time capable exhaust gas temperature model is also inherently known and can be modularly adapted to the respective configuration of the system consisting of the internal combustion engine and exhaust gas system and the respective components contained therein. A real-time capable temperature model makes it possible to determine and optionally precalculate the exhaust gas temperature with an update rate of the temperatures to be modeled that is required for controlling the internal combustion engine that can, e.g., be used in a road vehicle.

SUMMARY

The present invention differs from the prior art specified in the introductory section by way of the characterizing features of the disclosure. It is thereby provided that values of correcting variables which are associated with the further input variables are read out from a further characteristic map which is addressed by further input variables dependent on output variables of the first characteristic map, whereby the read-out correcting variables are predefined such that specified maximum values of the component temperature are not exceeded for the component through which the exhaust gas of the internal combustion engine flows.

The features of the invention advantageously reduce the application effort and improve the pilot control of the temperature-limiting corrections.

The further characteristic map is preferably an at least partially inverted characteristic map with respect to the first characteristic map. By inverting the characteristic map for determining the exhaust gas temperature at the exhaust gas valves of the internal combustion engine, a model-based pilot control for component protection and, in particular, for protecting the exhaust gas manifold and/or the catalytic converter from excessive temperatures can be achieved. In addition, supplementary control can be almost independent of the application status of the exhaust gas temperature model, and the order in which the three correcting variables- charging limitation, lambda, and water quantity to be injected-intervene to limit the temperature can be freely selected. Regarding non-invertible components of the exhaust gas system, such as pipes, exhaust gas turbochargers, and timing elements, the difference in the actual values between the exhaust gas temperature at the exhaust gas valves and the component temperature dependent on the component to be protected (e.g., exhaust gas turbocharger) is taken into account in one embodiment.

The advantage thereby is that the pilot control based on the exhaust gas temperature model eliminates the need to apply the pilot control characteristic maps as a function of the respective speed/load point because the existing characteristic maps from the exhaust gas temperature model can be used. All necessary information on the current boundary conditions such as ambient conditions, operating modes of the motor etc. are already included in the addressing of the respective pilot control.

One preferred embodiment of the method provides that the component is an exhaust gas turbocharger.

It is also preferable that one of the further input variables of the inverted characteristic map, which are dependent on output variables of the first characteristic map, is dependent on a predefined maximum temperature of the component.

It is also preferable that one of the further input variables of the inverted characteristic map that is dependent on output variables of the first characteristic map is dependent on an actual temperature of the component.

A further preferred embodiment provides that a further input variable of the inverted characteristic map, which is dependent on output variables of the first characteristic map, is dependent on a difference between the actual temperature of the component and the predefined maximum temperature of the component.

It is also preferable that a further input variable of the inverted characteristic map, which is dependent on output variables of the first characteristic map, is dependent on a control correcting variable of a PI control of the difference between the actual temperature of the component and the predefined maximum temperature of the component.

It is also preferable that the actual temperature of the component is determined by a calculation model to which an output variable of the first characteristic map is fed as an input variable.

A further preferred embodiment provides that the input variable is a value of the temperature TAVactual occurring at the exhaust gas valves during operation of the combustion engine.

It is also preferable that the value of the temperature occurring at the exhaust gas valves during operation of the combustion engine is an output variable of the first characteristic map.

It is also preferable that a further input variable of the inverted characteristic map, which is dependent on output variables of the first characteristic map, is dependent on a difference between the actual temperature of the component and the temperature occurring at the exhaust gas valves during operation of the combustion engine.

A further preferred embodiment provides that the further input variable of the inverted characteristic map, which is dependent on output variables of the first characteristic map, is dependent on the sum of the control correcting variable of the PI control of the difference between the actual temperature of the component and the predefined maximum temperature of the component, on the predefined maximum temperature of the component and on the difference between the actual temperature of the component and the temperature occurring at the exhaust gas valves during operation of the combustion engine.

It is also preferred that the correcting variables for the operation of an internal combustion engine comprising exhaust gas valves are charge correcting variables, using which the internal combustion engine is operated as a component protection measure and/or are correcting variables for the fuel/air ratio, using which the internal combustion engine is operated as a component protection measure and/or are correcting variables of a water injection, using which the internal combustion engine is operated as a component protection measure.

It is further preferred that the charge correcting variables and/or correcting variables for the fuel/air ratio, using which the internal combustion engine is operated and/or correcting variables of a water injection system are determined in parallel and are used in a predefined sequence as component protection measures, whereby a first of the component protection measures is initially used in the actuation of the associated first correcting element and a second of the component protection measures is only used in the actuation of the associated second correcting element when the first component protection measure has reached a stop and a third of the component protection measures is only used in the actuation of the associated third correcting element when the second component protection measure has reached a stop.

With regard to the embodiments of the device, it is preferred that the device comprises a further characteristic map which is at least partially an inverted characteristic map with respect to the first characteristic map, which can be addressed by further input variables dependent on output variables of the first characteristic map and from which values of correcting variables associated with the further input variables dependent on output variables of the first characteristic map can be read out, whereby the correcting variables which can be read out are predefined such that specified maximum values of the component temperature are not exceeded for the component, through which the exhaust gas of the internal combustion engine flows.

It is also preferred that the device is configured to perform the method steps of one of the methods specified hereinabove.

The invention is also directed to a computer program that causes one of the above devices to perform the method steps of one of the above methods when executed on the device, and to a machine-readable storage medium comprising a computer program stored thereon.

Further advantages follow from the description and the enclosed drawings.

It is understood that the features specified hereinabove and the features yet to be explained hereinafter can be used not only in the respectively specified combination, but also in other combinations, or on their own, without departing from the scope of the present invention.

BRIEF DESCRIPTION OF THE DRAWINGS

Exemplary embodiments of the invention are shown in the drawings and are explained in greater detail in the subsequent description. Shown in each case in schematic form are:

FIG. 1 an internal combustion engine comprising an exhaust gas system, together with a functional block diagram, whereby the individual blocks disclose both method aspects and device aspects of the invention.

DETAILED DESCRIPTION

In detail, FIG. 1 shows an internal combustion engine 10 comprising an intake system 12, an exhaust gas system 14, and a control unit 16. The combustion chambers of the internal combustion engine 10 are filled with air from the intake system 12. The intake system 12 and the exhaust gas system 14 are connected to each other via an exhaust gas turbocharger 17. In addition to the exhaust gas turbocharger 17, the exhaust gas system 14 comprises at least one exhaust gas purification component, e.g. a catalytic converter 18 or a particulate filter 20. The change of combustion chamber charges is controlled by intake valves 22 and exhaust gas valves 24. The intake system 12 comprises an air volume correcting element 26 which can, e.g., be a throttle valve. An optional water injection nozzle 28 is used to inject water into the intake system 12 or into the combustion chamber of the internal combustion engine 10, depending on where it is installed. Fuel injection nozzles 30 are used to inject fuel into the intake system 12 or the combustion chamber, depending on where they are installed.

The charge in the combustion chamber comprising air and fuel, the air coefficient lambda of the combustion chamber charging, and the ignition angle of the combustion chamber charging are correcting variables, using which the torque generation of the internal combustion engine 10 is controlled. The correcting variables are generated by the control unit 16, depending on the torque requirements of a driver and/or functions such as driving dynamics control. The charge in the combustion chamber comprising air and fuel is ignited by means of a spark plug. As a result of the actuation, a first exhaust gas temperature is adjusted at the exhaust gas valves 24 of the internal combustion engine 10.

Regarding the first exhaust gas temperature, it is assumed that this temperature depends on the operating parameters load (or charge) and speed, as well as directly on the ignition angle efficiency and the lambda split setting (in different combustion chambers, different values of the air coefficient lambda, i.e. the composition of the fuel/air ratio, are set). In addition, the first temperature can also depend on further correcting variables, such as the idling speed or parameters for late injection, which lead to increased heat release in the combustion chambers of the internal combustion engine 10.

During the subsequent flow through the exhaust gas system 14, the exhaust gas temperature generally decreases at an increasing distance from the exhaust gas valves 24. The exhaust gas temperature prevailing at one location of the exhaust gas system 14, be it the location of the turbine of the exhaust gas turbocharger 17, a location of a further component such as a catalytic converter 18 or the particulate filter 20 and a location of a pipe section 31 of the exhaust gas system 14 connecting components, is continuously calculated by an exhaust gas temperature model.

The exhaust gas turbocharger 17, the catalytic converter 18, the particulate filter 20, and a pipe section 31 of the exhaust gas system 14 connecting two of these components are each an example of the component, through which the exhaust gas of the internal combustion engine 10 flows. In particular, the exhaust gas temperature model is preferably a real-time capable forward model 38. In this context, a forward model 38 is understood to mean a model for a temperature distribution in an exhaust gas system 14, in which several components arranged one behind the other in terms of flow, such as an exhaust gas turbocharger 17, a catalytic converter 18, a particulate filter 20, and a pipe section 31 of the exhaust gas system 14 connecting two of these components in each case, are present and in which the outlet temperature of a specific component of these components corresponds to the inlet temperature of the further component immediately downstream of the specific component. The exhaust gas temperature model is preferably modularly adaptable to the respective configuration (type and arrangement of the components) of the exhaust gas system 14 and the respective components contained therein. The components of the exhaust gas system 14 are in particular an exhaust gas turbocharger 17, a catalytic converter 18, and an exhaust gas pipe section 31. Such temperature models are assumed to be inherently known.

If the temperature prevailing downstream of the exhaust gas valve 24 in the exhaust gas system 14 is known, the inlet temperature of the first component (e.g., an exhaust gas turbocharger 17) in the exhaust gas system 14 can be calculated using a pipe temperature model, whereby the inlet temperature essentially depends on the temperature at the exhaust gas valve 24, the vehicle speed, the ambient temperature and the exhaust gas mass flow.

The forward model can be used to determine the temperatures of the individual components of the exhaust gas system, and the respective maximum cylinder charge is determined via a partial inversion of the first characteristic map, using which the temperature at the exhaust gas valve is determined as a function of the maximum permissible temperature of the component (specified by test bench measurements for the component at its location in the exhaust gas system). Preferably, the amount of fuel to be injected is determined alternatively or additionally via a further partially inverted characteristic map for the air coefficient lambda. Another preferred alternative or addition is to determine the amount of water to be injected using a further partially inverted characteristic map.

FIG. 1 also shows a functional block diagram of method aspects and device aspects of an exemplary embodiment of the invention. During operation of the internal combustion engine 10, operating parameters of the internal combustion engine 10 are recorded by a sensor system 32. In addition to the sensors that detect the operating parameters, the sensor system 32 preferably also comprises a driver request sensor that can be used to detect a torque request from an operator of the internal combustion engine. Based on these operating parameters, the control unit 16 preferably forms a target value for the relative charging rl of the combustion chambers of the internal combustion engine 10. This target value is used to fulfill a torque requirement of the operator of the internal combustion engine 10 or a function, e.g. driving dynamics control of a motor vehicle driven by the internal combustion engine 10.

In a first block 34, a target value for the relative charging is formed, and a first characteristic map 36 is addressed, which associates the target value of the relative charging with an actual value of the exhaust gas temperature, which is set at the exhaust gas valves 24 during combustion of the combustion chamber charges. The first characteristic map 36 is a component of an exhaust gas temperature model, as described hereinabove.

A second block represents a forward model 38, which can be used to model actual values of exhaust gas temperatures that are set downstream of the exhaust gas valves 24, for example on a component such as an exhaust gas turbocharger 17, or also on another component or pipe section 31 of the exhaust gas system 14.

Regarding a component that is to be protected against overheating, temperatures of the component for various operating points of the internal combustion engine 10 are stored in a characteristic map 40 to be applied. The further explanation relates in particular to an exhaust gas turbocharger 17 as an example of a component to be protected, but also applies, with any necessary modifications, to other components of the exhaust gas system 14 to be protected, e.g. a catalytic converter, particulate filter, or pipe section.

In a first logic operation 42, the actual value of the exhaust gas temperature formed in the forward model 38 is subtracted from these maximum permissible temperatures of the exhaust gas turbocharger that can be read from the characteristic map 40. The difference thus formed is fed to a regulator 44, in particular a PI regulator, in order to correct deviations of the current component temperature modeled in the forward model 38 from the maximum permissible temperature of the component read from the characteristic map 40.

In a second logic operation 46, the actual value of the temperature of the component formed in the forward model 38 is subtracted from the actual temperature at the outlet valves 24 that can be read from the first characteristic map 36.

In a third logic operation 48, the sum of the two differences and the maximum permissible temperature of the component read from the characteristic map 40 is formed.

This sum is used to address a second characteristic map 50, in which the values of the charging rl to be set are stored. The second characteristic map 50 is derived from the first characteristic map 36 by partial inversion.

The difference between the actual value at the exhaust gas valve 24 and the temperature to be controlled is determined and calculated for the non-invertible components such as pipes, components such as exhaust gas turbochargers and timing elements because the partially inverted characteristic map 50 relates to the temperature at the exhaust gas valve 24 of the combustion engine 10.

While the first characteristic map 36 is addressed by rl values and outputs values of the exhaust gas temperature at the outlet valves 24 that are dependent on rl, the second characteristic map 50 is addressed by the temperature values formed in the third logic operation 48 and outputs rl values leading to these temperature values or charge correcting variables leading to these charge values for the air volume correcting element 26.

However, this only applies to temperature values formed in the third logic operation 48 that are not greater than the maximum permissible component temperature in each case. For the temperature values formed in the third logic operation 48, which are greater than the maximum permissible component temperature in each case, the second characteristic map 50 outputs target values or correcting variables for charging, when using which the maximum permissible component temperature is at least ideally not exceeded. This is achieved by reducing the charges. For the temperature values formed in the third logic operation 48, which are greater than the maximum permissible component temperature in each case, the combustion chamber charges are lower than for the temperature values formed in the third logic operation 48, which are not greater than the maximum permissible component temperature in each case.

Less energy is released during combustion of the reduced combustion chamber charging than would be released during combustion of the larger combustion chamber charging. As a result of the actuation, a first exhaust gas temperature is set at the exhaust gas valves 24 of the internal combustion engine 10. The charge correcting variable selected in this way is used to actuate the air volume correcting element 26, so that the result is an actual charging that corresponds to the smaller of the two charging correcting variables.

The exhaust gas temperature at the exhaust gas valves 24 is lower than if the larger of the two combustion chamber charges had been combusted.

This desired effect is therefore achieved in the exemplary embodiment described hereinabove by limiting the combustion chamber charges in a subregion 52 of the second characteristic map 50. The second characteristic map 50 has a further sub-region 54 in which the pairs of values from temperature and charging are inverted compared to the first characteristic map 36. The input variables and the output variables of the first characteristic map 36 are interchanged in this further subregion 54 of the second characteristic map 50, but are preferably equal in amount for both characteristic maps 36, 50, so that the second characteristic map 50, or the further sub-region 54 of the second characteristic map 50, arises from the first characteristic map 36 by partial inversion of the first characteristic map 36.

As an alternative or in addition to the charging limitation, which is based on a determination of the maximum permissible temperature (specified by application or from the component point of view at the point to be protected), a water injection quantity can be determined via a further partially inverted characteristic map for the exhaust gas lambda (i.e., the enriching) and via a further partially inverted characteristic map. Both an alternative or supplementary enriching of the fuel/air mixture of the combustion chamber charges (has a temperature-reducing effect) and an alternative or supplementary injection of water (also has a temperature-reducing effect) can achieve the desired effect of limiting the component temperature as a component protection measure. An input variable for the enriching characteristic map 50' can be formed in the same way as the input variable for the inverted characteristic map 50, which is used to protect the component by limiting the charge. The formation of this input variable is represented by block 48'. Similarly, an input variable for the inverted water injection characteristic map 50" can be formed in the same way as the input variable for the inverted characteristic map 50. The formation of this input variable is represented by block 48". The blocks 48' and 48" preferably have a structure similar to the structure of the ensemble of blocks 34 to 48 shown in FIG. 1.

Water can be injected by means of water injection nozzles 28, and fuel can be injected by means of fuel injection nozzles 30.

If a plurality of these component protection measures are used on the same internal combustion engine, then the calculations required for these component protection measures are performed in parallel, whereby only one of the component protection measures is varied at a time. This separation is performed in order to avoid mutual interference between the component protection measures.

As soon as more than one component protection measure is required to limit the temperature, one of the component protection measures is controlled to a stop or to a predefined extreme value at which the greatest temperature reduction effect occurs. The order in which the component protection measures are activated can be established by test bench measurements.

Possible sequences of component protection measures can be, for example:

Example 1: Initially reducing the charge; when a predefined charging limit is reached, enriching the fuel/air mixture;

Example 2: Initially enriching the fuel/air mixture; reduction of the charge when a predefined enriching limit is reached;

Example 3: Initially reducing the charge; when a first charging limit is reached, enriching the fuel/air mixture; when a predefined enriching limit is reached, further reduction of the charge;

Example 4: Initial water injection; when a predefined maximum water injection rate is reached, charge reduction; when a predefined charging limit is reached, enriching the fuel/air mixture.

The invention claimed is:

1. A computer-implemented method for generating correcting variables for operation of an internal combustion engine (10) which comprises exhaust gas valves (24) and which comprises at least one component (17, 18, 20), through which exhaust gas of the internal combustion engine flows, wherein values of the temperature occurring at the exhaust gas valves (24) during operation of the internal combustion engine (10) are read out from a first characteristic map (36) using operating parameters of the internal combustion engine (10), the method comprising:

reading, via a computer, values of correcting variables from a further characteristic map (50), which is an inverted characteristic map with respect to the first characteristic map (36), wherein the values of correcting variables are read out from the further characteristic map (50) using further input variables dependent on output variables of the first characteristic map (36), wherein the output variables of the first characteristic map (36) are the values of the temperature occurring at the exhaust gas valves (24), reading, via the computer, the values of correcting variables associated with the further input variables, wherein the correcting variables read out are predefined such that specified maximum values of the component temperature are not exceeded for the component (17, 18, 20, 31) through which the exhaust gas of the internal combustion engine (10) flows, and controlling, via the computer, operation of the internal combustion engine using the correcting variables.

2. The method according to claim 1, wherein the component (17, 18, 20, 31) is an exhaust gas turbocharger (17).

3. The method according to claim 1, wherein one of the further input variables of the inverted characteristic map (50), which are dependent on output variables of the first characteristic map (36), is dependent on a predefined maximum temperature of the component (17, 18, 20, 31).

4. The method according to claim 3, wherein one of the further input variables of the inverted characteristic map (50), which are dependent on output variables of the first characteristic map (36), is dependent on an actual temperature of the component (17, 18, 20, 31).

5. The method according to claim 4, wherein one of the further input variables of the inverted characteristic map (50), which are dependent on output variables of the first characteristic map (36), is dependent on a difference between the actual temperature of the component (17, 18, 20, 31) and the predefined maximum temperature of the component.

6. The method according to claim 5, wherein one of the further input variables of the inverted characteristic map (50), which are dependent on output variables of the first characteristic map (36), is dependent on a control correcting variable of a PI control of the difference between the actual temperature of the component (17, 18, 20, 31) and the predefined maximum temperature of the component (17, 18, 20, 31).

7. The method according to claim 5, wherein the actual temperature of the component (17, 18, 20, 31) is determined by a calculation model to which an output variable of the first characteristic map (36) is supplied as input variable.

8. The method according to claim 7, wherein the input variable is a value of the temperature occurring at the exhaust gas valves (24) during operation of the internal combustion engine (10).

9. The method according to claim 8, wherein the value of the temperature occurring at the exhaust gas valves (24) during operation of the internal combustion engine (10) is an output variable of the first characteristic map (36).

10. The method according to claim 9, wherein one of the further input variables of the inverted characteristic map (50), which are dependent on output variables of the first characteristic map (36), is dependent on a difference between the actual temperature of the component (17, 18, 20, 31) and the temperature occurring at the exhaust gas valves (24) during operation of the internal combustion engine (10).

11. The method according to claim 10, wherein the further input variable of the inverted characteristic map (50), which is dependent on output variables of the first characteristic map (36), depends on a sum (block 48) of the control correcting variable of a PI control (44), the difference (logic operation 42) between the actual temperature (block 38) of the component (17, 18, 20, 31) and the predefined maximum temperature (block 40) of the component (17, 18, 20, 31), on the predefined maximum temperature (block 40) of the component (17, 18, 20, 31) and the difference (logic operation 46) between the actual temperature (path 38) of the component (17, 18, 20, 31) and the temperature (from characteristic map 36) occurring at the exhaust air valve (24) during operation of the internal combustion engine (10).

12. The method according to claim 1, wherein the correcting variables for the operation of an internal combustion engine (10) comprising exhaust gas valves (24) are charge correcting variables and/or correcting variables for a fuel/air ratio, using which the internal combustion engine (10) is operated and/or correcting variables of a water injection, using which the internal combustion engine (10) is operated as a component protection measure.

13. The method according to claim 12, wherein the charge correcting variables and/or correcting variables for the fuel/air ratio, using which the internal combustion engine (10) is operated, and/or correcting variables of a water injection system are determined in parallel and are used in a predefined sequence as component protection measures, wherein a first of the component protection measures is initially used in the actuation of the associated first correcting element and a second of the component protection measures is only used in the actuation of the associated second correcting element when the first component protection measure has reached a stop and a third of the component protection measures is only used in the actuation of the associated third correcting element when the second component protection measure has reached a stop.

14. A computer for generating correcting variables for operation of an internal combustion engine (10), which comprises exhaust gas valves (24) and comprises at least one component (17, 18, 20, 31), through which exhaust gas of the internal combustion engine (10) flows, wherein the device comprises a first characteristic map (36), that reads out, using operating parameters of the internal combustion engine (10), values of the temperature which occurs at the exhaust gas valves (24) during operation of the internal combustion engine (10), wherein the computer comprises a further characteristic map (50) that reads out, using input variables dependent on output variables of the first characteristic map (36), values of correcting variables, and the further characteristic map (50) is at least partially an inverted characteristic map (50) with respect to the first characteristic map (36), wherein the readable values of the correcting variables are predefined such that specified maximum values of the component temperature are not exceeded for the component (17, 18, 20, 31) through which the exhaust gas of the internal combustion engine (10) flows, wherein on output variables of the first characteristic map (36) are the values of the temperature which occurs at the exhaust gas valves (24).

15. A non-transitory, computer-readable storage medium comprising instructions that when executed by a computer cause the computer to perform the method of claim 1.

* * * * *